(No Model.)

F. D. WHEELWRIGHT.
COFFEE OR TEA POT.

No. 450,208. Patented Apr. 14, 1891.

WITNESSES
X. H. Norris,
J. A. Rutherford

INVENTOR
Frederick D. Wheelwright.
By James L. Norris
Atty.

UNITED STATES PATENT OFFICE.

FREDERICK D. WHEELWRIGHT, OF WASHINGTON, DISTRICT OF COLUMBIA, ASSIGNOR OF ONE-HALF TO THOMAS S. WHEELWRIGHT, OF RICHMOND, VIRGINIA.

COFFEE OR TEA POT.

SPECIFICATION forming part of Letters Patent No. 450,208, dated April 14, 1891.

Application filed July 9, 1890. Serial No. 358,194. (No model.)

*To all whom it may concern:*

Be it known that I, FREDERICK D. WHEELWRIGHT, a citizen of the United States, residing at Washington, in the District of Columbia, have invented new and useful Improvements in Coffee or Tea Pots, of which the following is a specification.

My invention relates to certain improvements in vessels or pots for making coffee or tea.

It is my purpose to provide a simple and comparatively inexpensive construction and organization of parts, whereby such vessel may be used either for leaching or steeping without removing from or adding to the parts of said device.

It is my further purpose to simplify and improve the construction and operation of this class of devices, to cheapen the cost of manufacture, to provide simple and novel means whereby the leaching or steeping cup may be raised and lowered, and to combine with the same a device for effecting said results which operates upon the exterior of the vessel or pot.

It is my purpose, finally, to provide a novel construction for the threaded shaft upon which the steeping and leaching cup moves, and to combine such parts in a novel manner.

The invention consists, to these ends, in the several novel features of construction and new combinations of parts, all fully described hereinafter, and then definitely pointed out in the claims following this specification.

To enable others skilled in the art to make and use said invention, I will describe the same in detail, reference being had to the accompanying drawings, in which—

Figure 1:
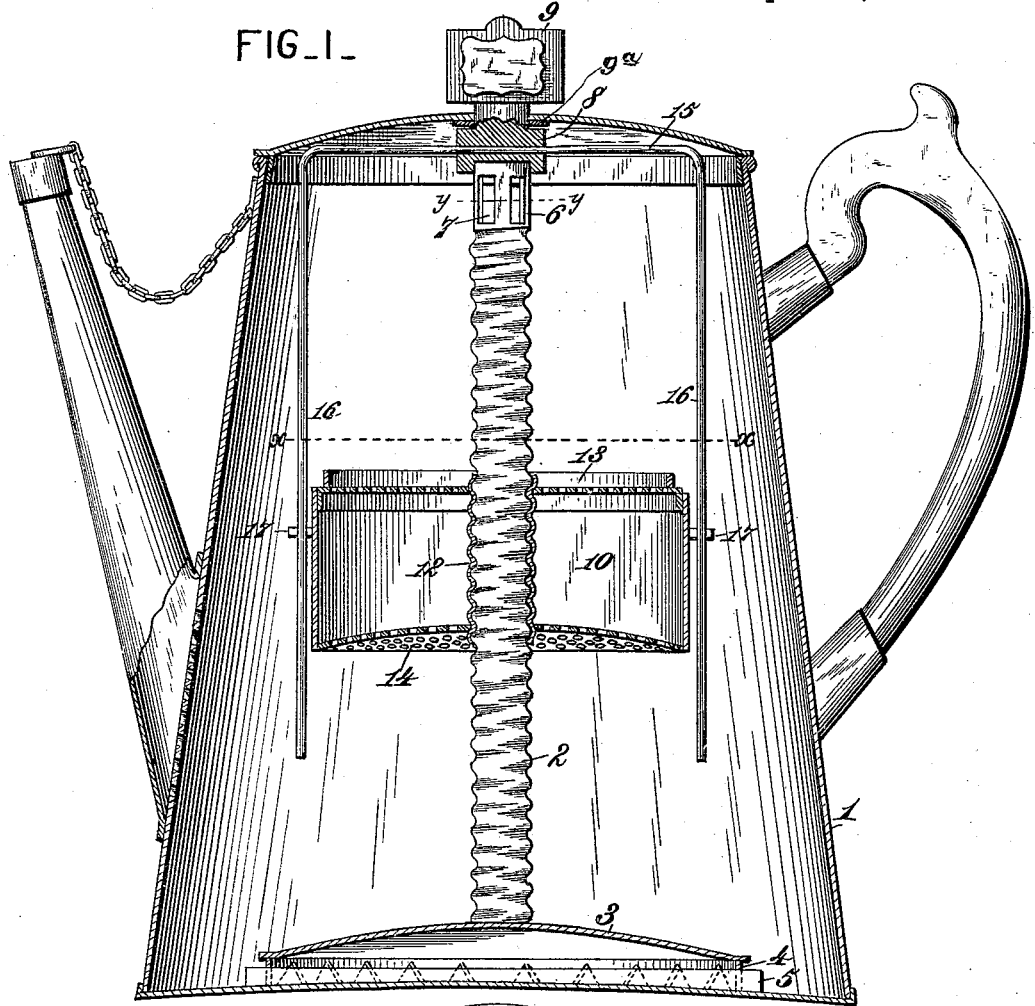
Figure 2:
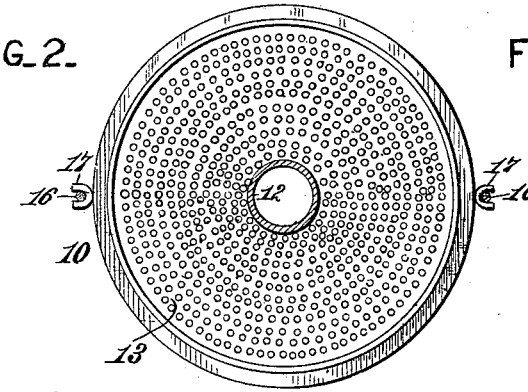
Figure 3:
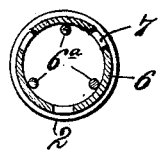

Figure 1 is a central vertical section showing my invention. Fig. 2 is a sectional view showing the leaching and steeping cup, the section being taken on the line $x\ x$, Fig. 1. Fig. 3 is a transverse section of the upper end of the threaded shaft on which the steeping-cup rises and falls, the section being taken in the plane $y\ y$, Fig. 1.

In the said drawings, the reference-numeral 1 denotes the body of the vessel or pot, which may be made of any suitable sheet metal and of any desired form, that illustrated being of the ordinary shape and provided with the usual handle and spout.

Within the body 1 is arranged a central vertical shaft 2, extending from top to bottom, being rigidly connected at the latter point with a species of inverted funnel 3, which overlies a part of the bottom of the vessel. This inverted funnel is provided with a notched or serrated rim or flange 4, resting directly upon the bottom and engaging with lugs 5, by which the funnel is prevented from rotating.

The threaded shaft may be formed in several different ways. For example, it may be constructed of spun sheet metal, or it may be formed by winding a metallic cylinder spirally, with a wire of suitable diameter, and then soldering. At its upper end the shaft is provided with a shell 6, strengthened by vertical wires $6^a$, arranged at intervals and soldered to the interior face of the shell. Between these wires are formed perforations or openings 7, of suitable form, size, and number. This shell supports a head 8, provided with a reduced bearing portion, which lies in a bearing or opening in the cover, and has an exterior handle or key 9, whereby rotary motion may be given to the head in either direction, the latter being provided with a recess in which the end of the shell 6 seats. A washer or packing-ring $9^a$ is provided, which surrounds the reduced bearing passing through the cover, to aid in forming a close joint and prevent the escape of steam.

Upon the threaded shaft 2 is mounted the leaching or steeping cup, consisting of a vessel 10 of suitable diameter and preferably cylindrical. Through the center of the cup passes a threaded tube 12, which is so formed as to embrace the threads of the shaft 2 without impeding the rotation of the tube 12 thereon. The ends of this tube extend beyond the bottom of the cup by a distance equal to about one thread of the shaft 2, more or less, and a similar extension is made above the perforated cup-shaped top or cap 13. The bottom 14, which is preferably of convex form, is also supplied with numerous small perforations.

Passing through the head 8 is a horizontal arm 15, centrally and rigidly mounted therein, and having at its extremities vertical arms 16, which extend downward to a point some little distance above the bottom of the vessel or pot. The said arms drop close to diametrically-opposite points on the cup 10, from the outer face of which project forked lugs 17, engaging the arms 16 and sliding thereon in either direction vertically, and at the same time compelling the rotation of the cup and its consequent rise and fall upon the threaded shaft 2. These lugs are shown as forked, but they may be provided with openings, which receive the arms 16 and confine them upon all sides.

The operation of the device is as follows: A suitable quantity of coffee or tea, as the case may be, is placed in the cup 10, and the perforated dish-shaped cover is then fitted closely within the open top of said cup. The arms 16 are then engaged with the forked lugs 17 and the cover of the vessel 1 is tightly closed, a suitable quantity of water being first placed in the bottom. If it is desired to leach the coffee, the head 8 is revolved until the cup 10 is raised to a suitable height above the surface of the water; or, if preferred, this may be effected manually before the coffee is placed therein. When properly prepared, the vessel is placed upon the stove or heater, where the water is brought to the boiling-point. As its temperature increases, the water gradually rises in the vertical shaft 2 until it overflows through the openings in the shell 6 and runs down within the perforated cover of the cup, by which it is dripped upon the coffee, through which it slowly percolates, passing out through the perforated bottom of the cup, by which a thorough separation of the leached coffee from the solid contents of the cup is effected. This process is continued until the coffee or tea is thoroughly leached.

The method of using the device for steeping or drawing is similar, save that the cup 10 is lowered until it is submerged to the proper point.

The body of the coffee or tea pot may be of uniform diameter from top to bottom, if preferred, and the construction may be varied in many other details without departing from my invention.

The pitch of the thread upon the vertical tubular shaft 2 may be varied within certain limits to any desired degree to give a rapid rise and fall of the cup 10, which is to be preferred in all cases.

What I claim is—

1. A coffee or tea pot having a vertical rigid threaded shaft supported therein and communicating with the interior thereof at its upper and lower end portions, in combination with a leaching and steeping cup having a threaded tube or sleeve engaging the threaded shaft and adapted to turn thereon, a head resting upon the upper end of the threaded shaft, and arms carried by said head and adapted to engage with and rotate the cup to raise and lower the same, means being provided for operating said parts from the exterior of the cover of the vessel or pot, substantially as described.

2. In a coffee or tea pot, the combination, with the closed body thereof, of a threaded vertical tube or shaft rigidly mounted upon an inverted funnel resting on the bottom of the pot and extending nearly to the cover, its upper end being provided with a shell having perforations, a leaching and steeping cup having a central sleeve or tube provided with threads engaging the threads of the vertical tube, said cup having perforated bottom and a removable dish-shaped perforated cover, a revoluble head resting on the perforated shell on the upper end of the vertical tube, and an arm rigidly mounted in said head and provided with depending arms engaging lugs upon the leaching and steeping cup, substantially as described.

3. In a coffee or tea pot, the combination, with a body closed by a cover and a cap for the spout, of a central vertical tube formed of spun metal, rigidly mounted on and opening into an inverted funnel which rests upon the bottom of the pot, a steeping and leaching cup consisting of a vessel provided with a perforated bottom and a removable dish-shaped perforated top provided with a central tube or sleeve having threads meshing with the threads of the central vertical tube, a revoluble head resting upon a perforated shell forming the upper end of the said tube, and a horizontal arm carried by said head and having depending arms lying in forked lugs on the opposite outer faces of the cup, substantially as described.

4. In a coffee or tea pot, a central vertical threaded tube adapted to carry a revoluble steeping and leaching cup, said tube being provided at its upper end with a perforated shell, which is strengthened by wires arranged between the perforations and soldered to the inner face of the shell between the openings, substantially as described.

In testimony whereof I have affixed my signature in presence of two witnesses.

FREDERICK D. WHEELWRIGHT.

Witnesses:
JAMES A. RUTHERFORD,
PERCY B. HILLS.